United States Patent Office 3,198,830
Patented Aug. 3, 1965

3,198,830
PROCESS FOR PREPARING N-CHLOROPHENYL-N'-METHOXY-N'-METHYL
Otto Scherer, Gerhard Hörlein, and Rudolf Hübner, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed May 1, 1961, Ser. No. 106,440
Claims priority, application Germany, Apr. 17, 1958, F 25,522
3 Claims. (Cl. 260—553)

The present application is a continuation-in-part application of our copending application Serial No. 806,756 filed April 16, 1959, now abandoned, by Otto Scherer et al.

According to U.S. Patent application No. 664,916 of June 11, 1957, now U.S. Patent No. 2,960,534, N-chlorophenyl-N'-methyl-N'-methoxy-ureas are obtained according to the following reaction scheme

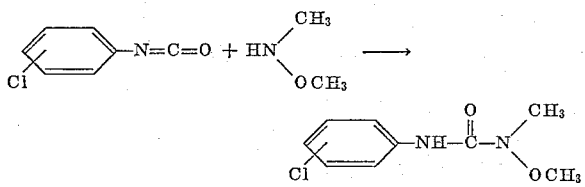

The products mentioned above, for instance the compound N-(para-chloro-phenyl) - N'- (methyl)-N'-(methoxy)-urea, melting at 76° C. to 78° C., obtainable according to the process mentioned are herbicides characterized by a rapid onset of action.

We have found that N-para-chlorophenyl-N'-methoxy-N'-methyl-urea is favorably obtained by adding O-methyl-hydroxylamine to a chlorinated phenyl-isocyanate and subsequently methylating the addition product.

Thus, the addition product of O-methyl-hydroxylamine on chlorinated phenyl-isocyanate can be methylated in a simple and clear way and with practically quantitative yield according to the following equation:

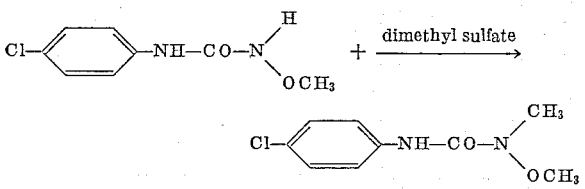

According to this process the operation is independent of the use of O,N-dimethyl-hydroxylamine which is expensive and difficult to prepare. The O-methyl-hydroxylamine now used instead can be obtained in a simple manner according to Traube, Ohlendorf and Zander (Ber. d. dtsch. chem. Ges. 53 (1920), 1477) from the potassium salt of hydroxyl-amino-disulfonic acid. It can, however, likewise be obtained by direct methylation from the sodium salt of hydroxylamino-disulfonic acid, without previously separating the latter from its solution.

The methylation is carried out in an alkaline-aqueous-alcoholic solution of the urea with, for instance, dimethyl-sulfate. It is of particular importance to apply the alcoholic-aqueous solution in a certain dosage and to maintain a certain temperature which can be seen from the example, since the reaction only distinctly occurs, when these conditions are maintained. With other reaction conditions re-action mixtures are formed which can be separated only with difficulties.

The urea methylated according to the new process is exclusively methylated at the nitrogen atom carrying the methoxy group and is separated from the solution within a short period of time in nearly quantitative yield in the form of well crystallized compounds.

The product obtained according to the process of the present invention is suitable for the destruction of plants and for the inhibition of undesired plant growth. Owing to its more rapid onset of action it is superior to the known urea derivatives.

When, for example, an aqueous suspension containing 0.25 to 1.0 gram per square meter of an agent that consists of 80% of para-N-chlorophenyl-N'-methoxy-N'-(methyl)-urea and 20% of a dispersing agent such as powder of staple fibers or regenerated cellulose, is brought in a pre-emergence treatment on the surface of the earth in clay pots sown with charlock and oats, it is found that the charlock and oat seed is completely destroyed by this treatment.

When the same test is carried out in the post emergent process, that is to say when the above-mentioned suspension in concentrations of 1.0 to 0.25 gram/m.$^2$ is poured on clay pots containing charlock and oat plants about 10 cm. high, the charlock plants are completely destroyed by this treatment. When using the suspension in a quantity of 1.0 gram per m.$^2$, the oat plants are completely destroyed, when using 0.5 gram per m.$^2$ they are almost completely destroyed and in the case of 0.25 gram per m.$^2$ they are so much injured that they decay in the course of time.

As results from the data of the following comparative test, the N-(para-chlorophenyl)-N'-methyl-N'-methoxy-urea in comparison with N-(parachlorophenyl)-N',N'-dimethyl-urea exhibits an effect characterized by a distinct protection of beans grown after the soil had been treated with the herbicide.

COMPARATIVE TEST

Test place _____ Test field Hattersheim.
Type of bean _____ St. Andreas.
Sowing _____ 24th August 1956.
Last valuation _____ 1st October 1956.

| Compound | Kg./hectare | Number of injured beans in percent when treating the soil | |
|---|---|---|---|
| | | 10 days before sowing | 1 day before swing |
| A | 2 | 8 | 28 |
| A | 1 | 3 | 4 |
| CMU | 2 | 61 | 81 |
| CMU | 1 | 46 | 67 |

A = N-(para-chlorophenyl)-N'-(methyl)-N'-(methoxy)-urea.
CMU = N-(para-chlorophenyl)-N',N'-(dimethyl)-urea.

Furthermore, we have found that urea derivatives of the general formula

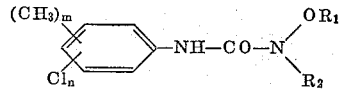

wherein $R_1$ represents an alkyl radical containing 1 to 4 carbon atoms, $R_2$ represents a saturated or unsaturated aliphatic radical containing 1 to 12 carbon atoms, which radical may be chlorosubstituted, $n$ stands for one of the integers 0, 1, 2 and 3, and $m$ stands for one of the integers 0 and 1, can be prepared by allowing phosgene to react in an inert reaction medium on an amine of the general formula

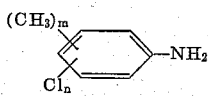

or the salt thereof, in which formula $m$ and $n$ have the meaning giving above, by reacting the isocyanate thus formed without isolation with an alkoxy amine of the general formula $$R_1—O—NH_2$$

wherein $R_1$ has the meaning given above, and then alkylating the alkoxy urea thus obtained with an alkylating agent in a mixture consisting of an alkali metal hydroxide solution and an alcohol.

For example, N-4-chlorophenyl-N'-methoxy-N'-methyl-urea can be obtained in a simple manner and in a very good yield according to the following reaction scheme:

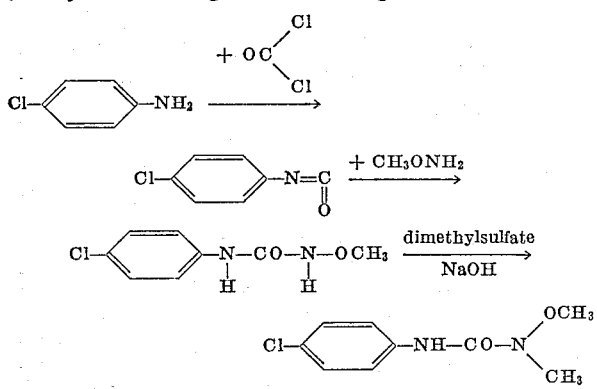

As starting materials there are to be considered free aromatic amines, for example, aniline and toluidines as well as chlorosubstituted anilines or toluidines or the salts thereof, for example hydrochlorides. The phosgenation of the salts is preferably carried out in a suspension at an elevated temperature, for example, at the boiling temperature of the reaction medium. The phosgenation of the free bases is preferably carried out in a solution with an excess of phosgene in two temperature ranges, first at a low temperature then at a higher temperature, in most cases at the boiling temperature.

As suitable reaction media there are applied hydrocarbons, for example, toluene, xylene, chlorinated hydrocarbons, for examlpe, chlorobenzene, dichlorobenzene, trichlorobenzene and chloronaphthalene.

The O-alkyl-hydroxylamines, containing 1 to 4 carbon atoms which are required for the reaction process, can easily be obtained by the alkylation of the sodium salt of hydroxylamino-disulfonate and by subsequent saponification of the reaction product according to the following scheme:

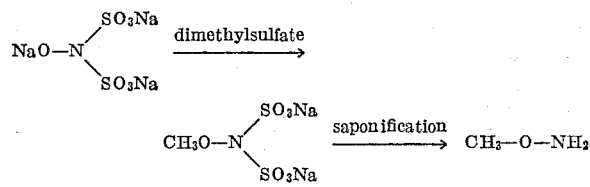

For the alkylation of the alkoxy ureas there enter into consideration dialkylsulfates, for example, dimethylsulfate or diethylsulfate, saturated or unsaturated alkylhalides which may be chlorosubstituted, for example, chlorides or bromides, and alkyltoluene sulfonates containing 1 to 12 carbon atoms.

The process of the present invention is preferably carried out in such a way that the phosgenation of the above mentioned amines or the salts thereof takes place in one of the above mentioned reaction media, the excess of the phosgen is separated with a dry inert gas, such as nitrogen, hydrogen, carbon dioxide or air, the reaction with the alkoxyamine is then carried out without isolation and purification of the isocyanate. The separated phenyl-alkoxy urea can be obtained with practically quantitative yield by filtering with suction. The filtration residue contains varying quantities of the reaction medium and is preferably used for the alkylation without further purification and drying. The suspension of the alkoxy urea can, however, likewise be subjected directly to the following alkylation after having evaporated some parts of the reaction medium.

The alkylation is preferably carried out in such a way that the alkoxy urea is dissolved or suspended together with the reaction medium of the phosgenation in a mixture consisting at least of the theoretically required quantity of alkali metal hydroxide solution and an alcohol corresponding to the alkylating agent, and then alkylated with the alkylating agents mentioned above. The reaction temperature and the reaction time naturally depend on the reactivity of the alkylating agent applied. The purification of the alkylation products is preferably carried out by distillation with steam. The reaction mixture can, however, likewise be poured into an excess of water, and the separated organic phase is then evaporated with steam. When cooled, the alkylated alkoxy urea separates from the residue in an oily or crystalline form and can be purified by recrystallization or distillation.

The process of the present invention shows the advantage that the operation is independent of the use of O,N-dialkyl-hydroxylamines, which are difficult to prepare. Besides that, alkyl groups, differing from those of the alkyl radical, can be introduced in a wide range of variation during the second alkylation process. Furthermore the process of the present invention shows the advantage that an isolation of the alkoxy urea in a pure form is not necessary and that it is possible to separate the reaction product in a simple manner and with a high purity after a distillation with steam.

The compounds obtained according to the process of the present invention have herbicidal and acaricidal properties and area used as pesticides.

The following examples serve to illustrate the invention but they are not intended to limit it thereto:

*Example 1*

N-(4-CHLOROPHENYL)-N'-(METHYL)-N'-(METHOXY)-UREA 2000 grams (10 mols) of N-(para-chlorophenyl)-N'-methoxy-urea, easily and quantitatively accessible by addition of O-methyl-hydroxylamine to para-chlorophenyl-isocyanate, are dissolved in 400 grams of sodium hydroxide solution of 10% strength (10 mols) and 5.5 liters of methanol. 1510 grams of dimethyl-sulfate (12 mols) are dropwise added at 30° C. to 40° C. After further stirring for 1 hour at room temperature a white, crystalline precipitate is separated, represented by the following formula:

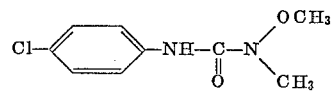

By subsequent vacuum filtration and drying the substance is isolated. Yield 2040 grams (95% of the theory). Melting point: 76° C. to 78° C.

*Example 2*

N-4-CHLOROPHENYL-N'-METHOXY-N'-METHYL UREA 800 grams of phosgene are dissolved in 2000 cc. of dried chlorobenzene at 10° C. 3.0 mols (384 grams) of 4-chloraniline dissolved in 2000 cc. of chlorobenzene are added while stirring at room temperature. When the temperature rises to about 50° C. a precipitate is formed. Further phosgene is added and heated within 6 hours at boiling temperature and this temperature is maintained until a complete dissolving is obtained. The excessive phosgene is evaporated at the same temperature by dry nitrogen into a flask which contains chlorobenzene.

After cooling 3.0 mols (141 grams) of methoxy amine are added, the temperature rises to about 50° C. The precipitating addition product is filtered with suction and without consideration of the adhering chlorobenzene is suspended in 240 cc. of water in a mixture consisting of 500 cc. of methanol and a solution of 3 mols (120 grams) of sodium hydroxide. 3 mols (378 grams) of dimethyl sulfate are added at 30° C. to 40° C. while stirring vigorously for 1 hour at 50° C. The unreacted dimethyl-sulfate is hydrolized in the following distillation with steam and the chlorobenzene and methanol are evaporated. When cooled, the remaining oil hardens and is then dried.

The yield amounts to 535 grams of N-4-chlorophenyl-N'-methoxy-N'-methyl urea (85% of the theoretical yield corresponding to the amount of the 4-chloraniline used). A sample recrystallized from petroleum ether has a melting point of 76° C. to 78° C. When this compound is mixed with the product obtained by adding O,N-dimethylhydroxylamine to 4-chlorophenylisocyanate, the melting point shows no depression.

*Examples 3 to 9*

The Examples 3 to 9 described in Table I are carried out in the same manner as shown in Example 2. In the Examples 3 to 9 the yields are between 80 and 85% of the theoretical amount, corresponding to the amine used. The compounds can be recrystallized from petroleum ether. The compounds described in the Examples 3 to 6 and 8 are identical with those obtained by adding O,N-dimethylhydroxylamine to the corresponding substituted phenylisocyanates.

C. while stirring vigorously and the temperature is maintained for 1 hour at about 50° C. The toluene and the methanol are evaporated with steam and the reaction product is obtained in the form of an oily residue which is dissolved in methylene chloride. After drying and removing the solvent, the residue is distilled under reduced pressure. 120 grams of N-phenyl-N'-n-butoxy-N'-methyl-urea are obtained by distillation under a pressure of 8 mm. mercury at 138° C. to 140° C. (54% of the theoretical amount, corresponding to the aniline used).

*Analysis.*—$C_{12}H_{18}N_2O_2$ (molecular weight 222). Calculated: 64.8% C, 8.1% H, 12.6% N. Found: 64.4% C, 8.1% H, 12.4% N.

*Example 11*

N-PHENYL-N'-METHOXY-N'-n-BUTYL-UREA

N-phenyl-N'-methoxy-urea is prepared according to the process described in Example 2 beginning with 1 mol of aniline. In order to carry out the butylation, the compound filtered with suction is suspended in a mixture consisting of 250 cc. of n-butanol and a solution of 1 mol (40 grams) of sodium hydroxide in 80 cc. of water. 1 mol (137 grams) of n-butyl bromide are added at 60° C. to Table I

| Example | Final product | Aromatic amine | Alkylating agent | Reaction medium | Melting point, °C. | Analysis |
|---|---|---|---|---|---|---|
| 3 | N-(3-chlorophenyl)-N'-methyl-N'-methoxy-urea. | 3-chloraniline | Dimethylsulfate | Chlorobenzene/methanol. | 81 to 83 | Calc.: 13.0% N, 16.6% Cl. Found: 13.1% N, 16.9% Cl. |
| 4 | N-(3,4-dichlorophenyl)-N'-methyl N'-methoxy-urea. | 3,4-dichloraniline. | do | do | 90 to 91 | Calc.: 11.2% N, 28.5% Cl. Found: 11.0% N, 28.2% Cl. |
| 5 | N-(2,4,5-trichlorophenyl)-N'-methyl-N'-methoxy-urea. | 2,4,5-trichloraniline. | do | do | 95 to 96 | Calc.: 9.9% N, 37.6% Cl. Found: 9.8% N, 37.6% Cl. |
| 6 | N-(2-methyl-4-chlorophenyl)-N'-methyl-N'-methoxy-urea. | 2-methyl-4-chloraniline. | do | do | 66 to 67 | Calc.: 12.2% N, 15.5 % Cl. Found: 12.2% N, 15.5% Cl. |
| 7 | N-(4-chlorophenyl)-N'-ethyl-N'-methoxy urea. | 4-chloraniline | Diethylsulfate | Chlorobenzene/ethanol. | 90 to 91 | Calc.: 52.6% C, 5.7% H. Found: 52.9% C, 5.6% H. |
| 8 | N-phenyl-N'-methyl-N'-methoxy-urea. | Aniline | Dimethylsulfate | Chlorobenzene/methanol. | 59 to 60 | Calc.: 15.5% N. Found: 15.2% N. |
| 9 | N-phenyl-N'-ethyl-N'-methoxy-urea. | do | Diethylsulfate | Chlorobenzene/ethanol. | 92 to 93 | Calc.: 14.4% N. Found: 14.4% N. |

*Example 10*

N-PHENYL-N'-n-BUTOXY-N'-METHYL-UREA 250 grams of phosgene are dissolved in 650 cc. of dried toluene at 10° C. 1.0 mol (93 grams) of aniline, dissolved in 650 cc. of toluene are added at room temperature while stirring. Within 6 hours the mixture is heated to boiling temperature and this temperature is maintained until a complete dissolving is obtained. The excessive phosgene is removed as described in Example 2.

After cooling, 1.0 mol (89 grams) of n-butoxyamine are added at room temperature and the addition product is filtered with suction. Without consideration of the adhering toluene the N-phenyl-N'-butoxy-urea is suspended in a mixture of methanol and a solution of 1 mol (40 grams) of sodium hydroxide in 800 cc. of water. 1 mol (126 grams) of dimethyl sulfate is added at 30° C. to 40°

70° C. and the mixture is heated to reflux for 3 hours. By distillation with steam an oily residue is obtained. It is dissolved in methylene chloride, dried and distilled. 145 grams of N - phenyl - N'-methoxy-N'-n-butyl-urea are obtained under a pressure of 3 mm. of mercury at 119° C. to 120° C. (65% of the theoretical amount, corresponding to the aniline used).

*Analysis.*—$C_{12}H_{18}O_2N_2$ (molecular weight 222). Calculated: 64.8% C, 8.1% H. Found: 65.2% C, 8.0% H.

*Examples 12 to 24*

The Examples 12 to 24 as described in Table II are prepared in such a way that the methoxy-phenyl-ureas, obtained according to the process of Example 2, are reacted with the alkyl-halides indicated in column 3 of the Table II according to the process described in Example 11.

Table II

| Example | Final product | Aromatic amine | Alkylating agent | Reaction medium | Melting/boiling point, deg. | Yield ref. to alkyl. step, percent | Analysis |
|---|---|---|---|---|---|---|---|
| 12 | N-(4-chloro-phenyl)-N'-methoxy-N'-isopropyl urea. | 4-chloraniline | Isopropyl-bromide. | Iso-propanol/chlorobenzene. | 93–94° | 70 | Calc.: 11.9% N, 54.3% C, 6.2% H. Found: 12.0% N, 54.2% C, 5.8% H. |
| 13 | N-(4-chloro-phenyl)-N'-methoxy-N'-n-butyl-urea. | do | n-Butyl-bromide. | n-Butanol/chlorobenzene. | | 70 | Calc.: 56.1% C, 6.6% H. Found: 56.1% C, 6.8% H. |
| 14 | N-(4-chloro-phenyl)-N'-methoxy-N'-(2-methyl-propyl)-urea. | do | 2-methyl-propyl-bromide. | Iso-butanol/chlorobenzene. | 98–100° | 60 | Calc.: 11.3% N. Found: 11.3% N. |

Table II—Continued

| Example | Final product | Aromatic amine | Alkylating agent | Reaction medium | Melting/boiling point, deg. | Yield ref. to alkyl. step, per cent | Analysis |
|---|---|---|---|---|---|---|---|
| 15 | N-(4-chloro-phenyl)-N'-methoxy-N'-(1-methyl-propyl)-urea. | ----do---- | 1-methyl-propyl-bromide. | Sec. butanol/chlorobenzene. | 73–75° | 55 | Calc.: 10.8% N. Found: 10.6% N. |
| 16 | N-(4-chloro-phenyl)-N'-methoxy-N'-(3-methyl-butyl) urea. | ----do---- | 3-methyl-butyl-bromide. | Ethanol/chlorobenzene. | 41–42° | 55 | Calc.: 10.4% N, 13.1% Cl. Found: 10.5% N, 13.4% Cl. |
| 17 | N-(4-chloro-phenyl)-N'-methoxy-N'-allylurea. | ----do---- | Allylbromide. | Allyl-alcohol/chlorobenzene. | 79–80° | 80 | Calc.: 11.6% N, 55.0% C, 5.4% H. Found: 11.5% N, 54.8% C, 5.4% H. |
| 18 | N-(4-chloro-phenyl)-N'-methoxy-N'-(3,3-dichloralyl)-urea. | ----do---- | 3,3-dichlor-allyl-chloride. | Ethanol/chlorobenzene. | 95–96° | 70 | Calc.: 42.7% C, 3.6% H. Found 42.9% C, 3.6% H. |
| 19 | N-(4-chloro-phenyl)-N'-methoxy-N'-dodecyl-urea. | ----do---- | Dodecyl-bromide. | n-Butanol/chlorobenzene. | 34–35° | 90 | Calc.: 7.6% N, 9.6% Cl. Found: 7.2% N, 9.7% Cl. |
| 20 | N-(2-chloro-phenyl)-N'-methoxy-N'-n-butyl-urea. | 2-chloraniline | n-Butyl-bromide. | Ethanol/chlorobenzene. | Boiling point, 142–145°/1 mm. | 70 | Calc.: 13.8% Cl. Found: 14.2% Cl. |
| 21 | N-(2,4-dichloro-phenyl)-N'-methoxy-N'-n-butyl-urea. | 2,4-dichloraniline. | ----do---- | Butanol/chlorobenzene. | Liquid not dist. | 70 | Calc.: 9.6% N. Found: 9.5% N. |
| 22 | N-(2,4,5-trichlorophenyl)-N'-methoxy-N'-n-butyl-urea. | 2,4,5-trichloraniline. | ----do---- | ----do---- | ----do---- | 65 | Calc.: 9.0% N, 34.1% Cl. Found: 8.4% N, 33.6% Cl. |
| 23 | N-(2-methyl-4-chloro-phenyl)-N'-methoxy-N'-n-butyl-urea. | 2-methyl-4-chloraniline. | ----do---- | ----do---- | Liquid not dist. | 55 | Calc.: 10.4% N, 13.2% Cl. Found: 11.0% N, 12.8% Cl. |
| 24 | N-(4-methyl-phenyl)-N'-methoxy-N'-n-butyl-urea. | 4-methylaniline. | ----do---- | ----do---- | Melting point, 56–58°. | 60 | Calc.: 11.9% N. Found 12.3% N. |

We claim:
1. The process for preparing a compound of the formula

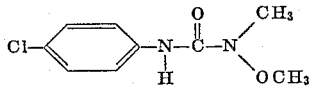

which comprises reacting a compound of the formula

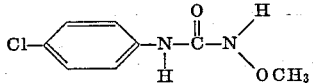

with dimethyl sulfate in an alkaline medium.
2. The process as in claim 1 wherein said alkaline medium is an alkaline solution of methanol.
3. The process as in claim 1 wherein the reactants are contacted at a temperature of from 30° C. to 60° C. in a mixture of about equal parts of methanol and about 10 percent aqueous solution of an alkali metal hydroxide.

References Cited by the Examiner

UNITED STATES PATENTS 2,908,704  10/59  Skiles _____ 260—453

FOREIGN PATENTS 1,076,117  2/60  Germany.

OTHER REFERENCES

Groggins, Unit Processes in Organic Synthesis, Third Edition, 1947, pages 566–7.

Jones, J. Amer. Chem. Soc., vol. 49, (1927), pages 1531 and 1538.

Wagner-Zook, Synthetic Org. Chem. (1953), page 572.

NICHOLAS S. RIZZO, *Primary Examiner.*

IRVING MARCUS, WALTER A. MODANCE,
*Examiners.*

UNITED STATES PATENT OFFICE
CERTIFICATE OF CORRECTION

Patent No. 3,198,830					August 3, 1965

Otto Scherer et al.

It is hereby certified that error appears in the above numbered patent requiring correction and that the said Letters Patent should read as corrected below.

In the heading to the printed specification, line 3, after "-METHYL" insert -- -UREA --.

Signed and sealed this 18th day of January 1966.

(SEAL)
Attest:

ERNEST W. SWIDER					EDWARD J. BRENNER
Attesting Officer					Commissioner of Patents